(12) United States Patent
Gold et al.

(10) Patent No.: US 9,206,952 B2
(45) Date of Patent: Dec. 8, 2015

(54) SOLAR-POWERED LIGHT SOURCE

(71) Applicant: Great American Merchandise and Events, Scottsdale, AZ (US)

(72) Inventors: Jason Gold, Scottsdale, AZ (US); Michael A. Parness, Scottsdale, AZ (US); Thomas Allen Sollars, II, Gilbert, AZ (US); Zhao Chunhai, Sichuan Province (CH)

(73) Assignee: Great American Duck Races, Inc., Scottsdale, AZ (US)

( * ) Notice: Subject to any disclaimer, the term of this patent is extended or adjusted under 35 U.S.C. 154(b) by 220 days.

(21) Appl. No.: 13/834,823

(22) Filed: Mar. 15, 2013

(65) Prior Publication Data

US 2013/0335953 A1  Dec. 19, 2013

Related U.S. Application Data

(60) Provisional application No. 61/661,723, filed on Jun. 19, 2012.

(51) Int. Cl.
*F21L 4/00* (2006.01)
*F21V 21/00* (2006.01)
(Continued)

(52) U.S. Cl.
CPC ............... *F21L 15/08* (2013.01); *B01F 1/0027* (2013.01); *C02F 1/76* (2013.01); *F21S 6/00* (2013.01); *F21S 9/03* (2013.01); *F21V 3/026* (2013.01); *F21V 21/06* (2013.01); *G09F 13/04* (2013.01); *G09F 27/007* (2013.01); *C02F 1/688* (2013.01);
(Continued)

(58) Field of Classification Search
CPC ............. F21L 15/08; F21L 4/025; F21L 4/08; F21L 4/00; F21L 11/00; F21S 9/03; F21V 3/026; F21V 21/06; F21Y 2101/02; F21W 21/00; F21W 2111/04; F21W 2111/047; F21W 2111/043; F21W 2131/307; F21W 2131/401; G09F 13/04; G09F 27/007; B01F 1/0027; C02F 1/76; C02F 1/688; C02F 2103/42
USPC ......... 362/158, 190, 183, 189, 204, 363, 806; 239/18; 441/13; 446/47, 91, 242
See application file for complete search history.

(56) References Cited

U.S. PATENT DOCUMENTS 2,619,303 A * 11/1952 Martin ........................... 244/33
3,280,633 A * 10/1966 Langguth .................. 73/864.31
(Continued)

FOREIGN PATENT DOCUMENTS

KR   20110006927 A  *  1/2011

OTHER PUBLICATIONS

Web page—Floating Solar Rainbow Light, Doheney's Water Warehouse—published May 1, 2010.
(Continued)

*Primary Examiner* — Jason Moon Han
*Assistant Examiner* — Omar Rojas Cadima
(74) *Attorney, Agent, or Firm* — Snell & Wilmer, LLP

(57) ABSTRACT

A solar-powered light source may comprise a solar-powered energy production module. The solar-powered light source may be self-righting. At least one of the energy production module, an energy storage module, a light emission device, or a diffuser may provide the weight for the self-righting effect. The weight may be located substantially near a bottom portion of the solar-powered light source in order to keep the solar-powered light source positioned upright.

8 Claims, 12 Drawing Sheets

(51) Int. Cl.
*F21S 6/00* (2006.01)
*F21S 9/03* (2006.01)
*F21V 3/02* (2006.01)
*F21V 21/06* (2006.01)
*G09F 13/04* (2006.01)
*G09F 27/00* (2006.01)
*C02F 1/76* (2006.01)
*B01F 1/00* (2006.01)
*F21W 121/00* (2006.01)
*F21Y 101/02* (2006.01)
*C02F 1/68* (2006.01)
*C02F 103/42* (2006.01)

(52) U.S. Cl.
CPC ........ *C02F 2103/42* (2013.01); *F21W 2121/00* (2013.01); *F21Y 2101/02* (2013.01)

(56) References Cited

U.S. PATENT DOCUMENTS

| | | | | |
|---|---|---|---|---|
| 4,809,458 | A | * | 3/1989 | Tanikuro et al. ............... 43/17.5 |
| 5,059,296 | A | * | 10/1991 | Sherman ..................... 204/229.8 |
| 5,231,781 | A | * | 8/1993 | Dunbar ........................... 43/17.5 |
| 5,362,267 | A | * | 11/1994 | Forrest ............................. 441/16 |
| 5,680,033 | A | * | 10/1997 | Cha ................................ 359/542 |
| 6,179,218 | B1 | * | 1/2001 | Gates ............................... 239/17 |
| 6,203,170 | B1 | * | 3/2001 | Patrick et al. .................. 362/234 |
| 6,508,929 | B1 | | 1/2003 | Mercer |
| 7,196,477 | B2 | | 3/2007 | Richmond |
| D559,943 | S | | 1/2008 | Mercer |
| 7,413,319 | B2 | | 8/2008 | Longoria et al. |
| 7,429,827 | B2 | | 9/2008 | Richmond |
| 7,510,651 | B1 | * | 3/2009 | Auger et al. ............. 210/167.11 |
| 7,717,582 | B2 | | 5/2010 | Longoria et al. |
| 7,753,546 | B2 | * | 7/2010 | Kuelbs .......................... 362/102 |
| 7,967,465 | B2 | | 6/2011 | Richmond |
| D652,374 | S | | 1/2012 | Mercer |
| 8,089,370 | B2 | | 1/2012 | Richmond |
| 8,104,914 | B2 | | 1/2012 | Richmond |
| 8,362,700 | B2 | | 1/2013 | Richmond |
| 2004/0144699 | A1 | | 7/2004 | Lin |
| 2006/0204328 | A1 | * | 9/2006 | Frey .................................. 404/9 |
| 2006/0291217 | A1 | | 12/2006 | Vanderschuit |
| 2007/0272622 | A1 | | 11/2007 | Mercer |
| 2008/0273319 | A1 | * | 11/2008 | VanderSchuit ............... 362/101 |
| 2009/0040749 | A1 | * | 2/2009 | Burgei et al. ................. 362/183 |
| 2012/0120642 | A1 | | 5/2012 | Sreshta |
| 2012/0195806 | A1 | | 8/2012 | Mulvihill |

OTHER PUBLICATIONS

Web page—Ultra Light Floating Pool Light, Doheney's Water Warehouse—published May 1, 2010.

* cited by examiner

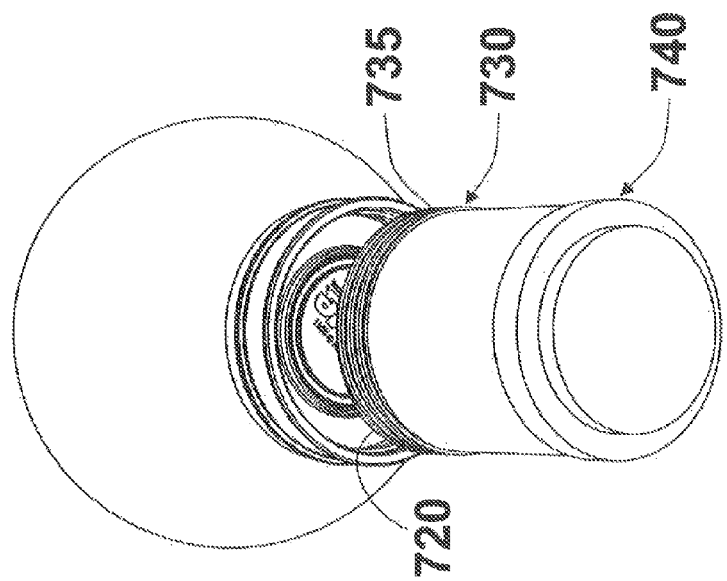
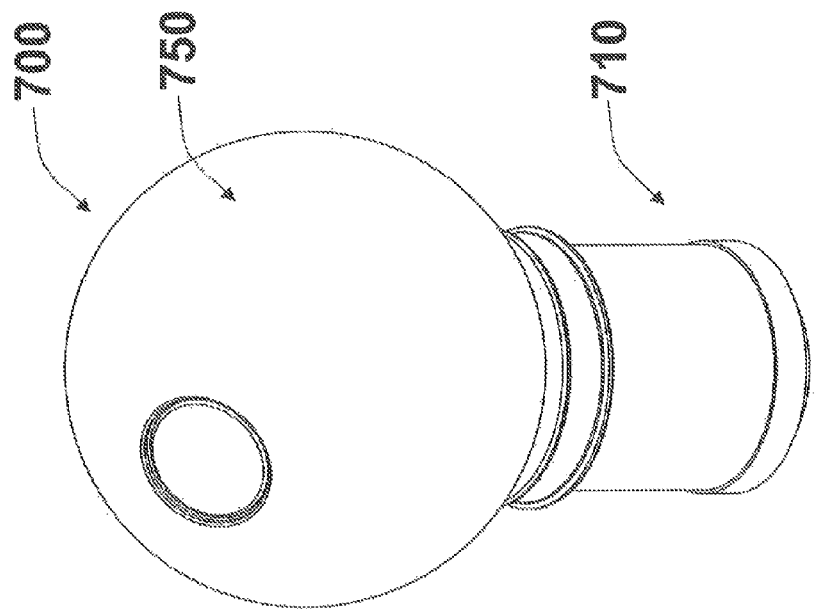

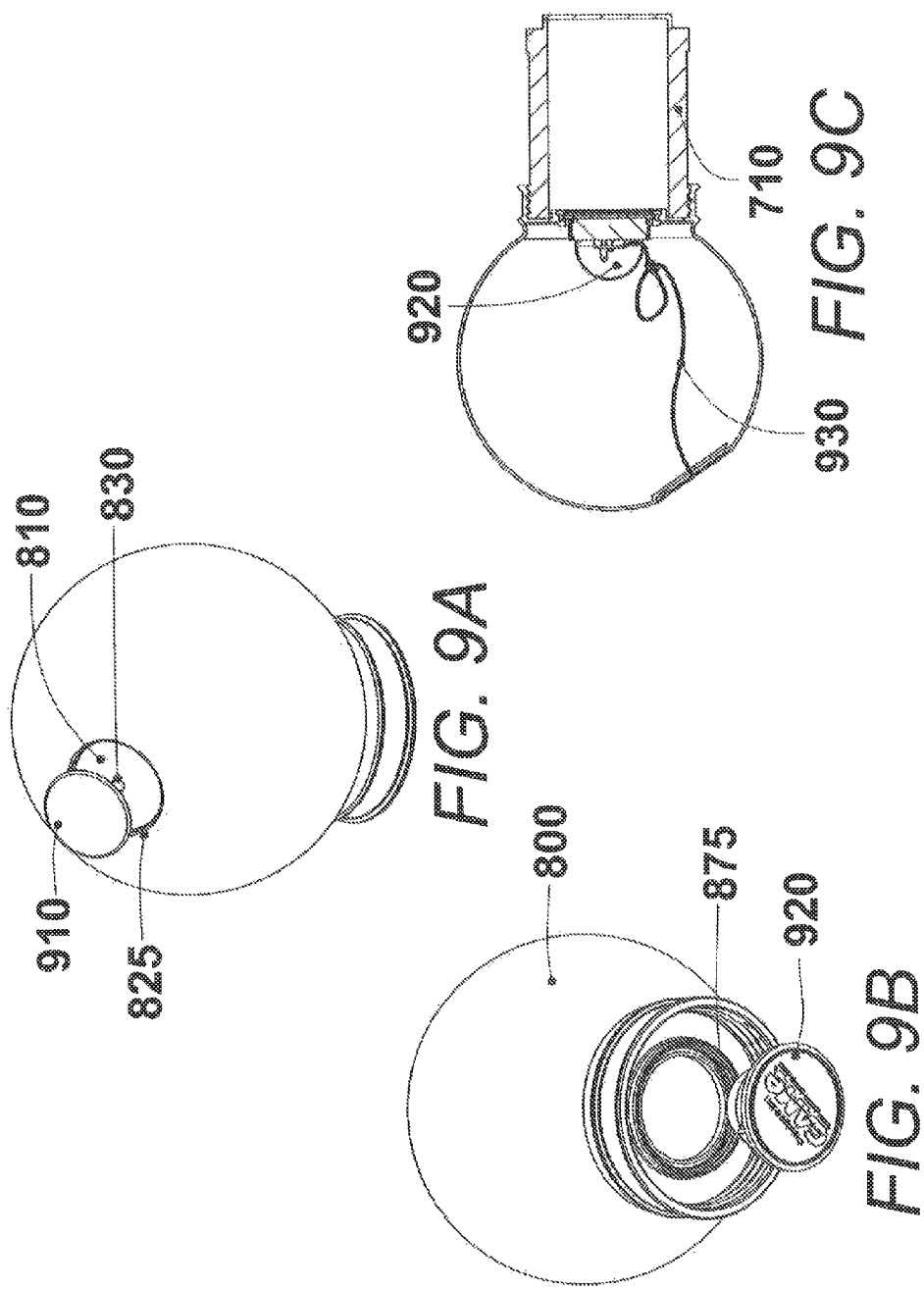

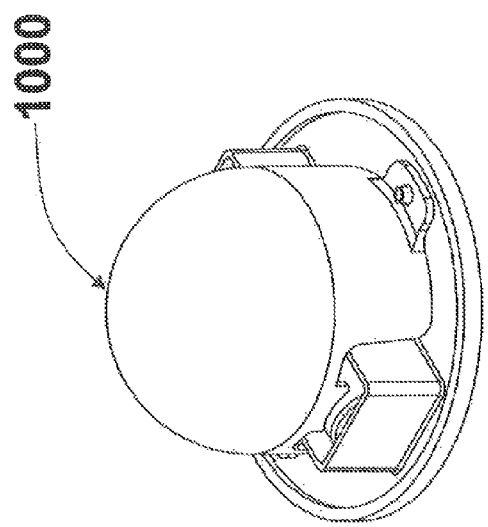
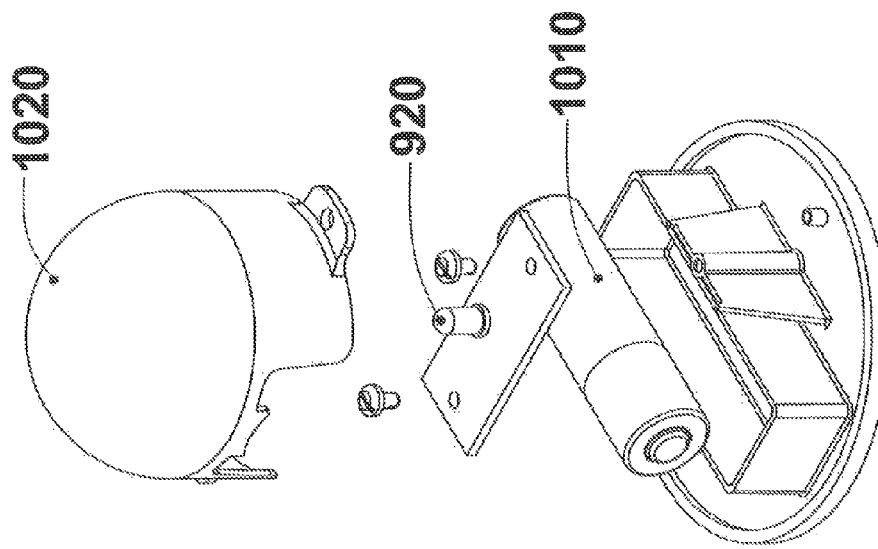

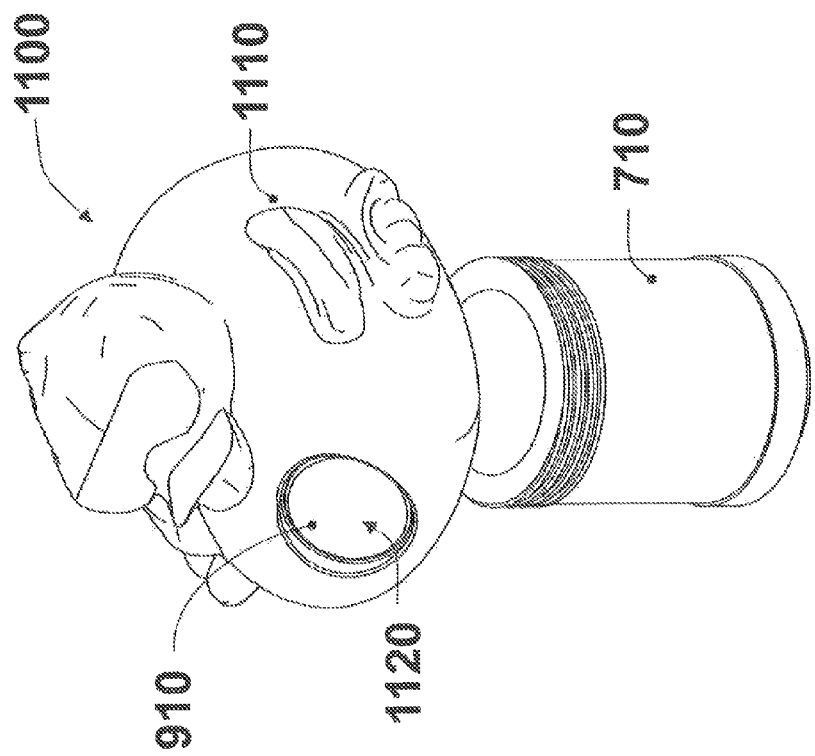

SOLAR-POWERED LIGHT SOURCE

CROSS REFERENCE TO RELATED APPLICATIONS

This application claims priority to, and the benefit of, U.S. Provisional Application Ser. No. 61/661,723 entitled "SOLAR-POWERED LIGHT SOURCE" and filed Jun. 19, 2012, which is incorporated herein by reference.

BACKGROUND

Solar-powered lighting is used for various functional and decorative purposes. Various solar-powered lights exist, however many solar lights are rigid items which require large packaging footprints relative to the size of the light, as well as a large amount of shelf space in a store. Existing rigid glass or plastic lights may break, dent, or crack when dropped or after many uses. Furthermore, solar lights may fall, spin, or be turned over, and the solar panels may not collect sufficient energy.

Additionally, solar-powered lights tend to be singularly functional, namely to provide light. As such, a need exists for durable light which have a small packaging footprint, are effective at collecting solar energy, and/or can provide functions beyond providing light.

SUMMARY

A solar-powered light source is disclosed. The solar-powered light source may comprise a hollow body, an energy production component, an energy storage component, a light emission device, a diffuser, and an inflation port. The hollow body may be flexible and collapsible. The energy production component may comprise solar cells. The energy storage component may comprise at least one of a battery and a capacitor. The diffuser may spread light from the light emission device to a larger area. The solar-powered light source may be self-righting. At least one of the energy production component, the energy storage component, and the light emission device may be located substantially at the bottom of the solar-powered light source in order to self-right the solar-powered light source. The hollow body may comprise a first pocket and a second pocket. The energy production component may be coupled to the first pocket, and the light emission device may be coupled to the second pocket. A chlorinator basket may be coupled to the hollow body.

BRIEF DESCRIPTION OF THE DRAWINGS

FIGS. 7A-7B illustrate a solar-powered light source with a chlorinator basket according to various embodiments;

FIGS. 9A-9C illustrate several views of a hollow body according to various embodiments;

FIGS. 10A-10B illustrate a light emission system according to various embodiments; and FIGS. 11A-11B illustrates a solar-powered light source in the shape of a character with a chlorinator basket according to various embodiments.

DETAILED DESCRIPTION

The detailed description of exemplary embodiments herein makes reference to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Furthermore, any reference to singular includes plural embodiments, and any reference to more than one component may include a singular embodiment.

In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature; structure, or characteristic in connection with other embodiments whether or not explicitly described. After reading the description, it will be apparent to one skilled in the relevant art(s) how to implement the disclosure in alternative embodiments.

Figure 1:
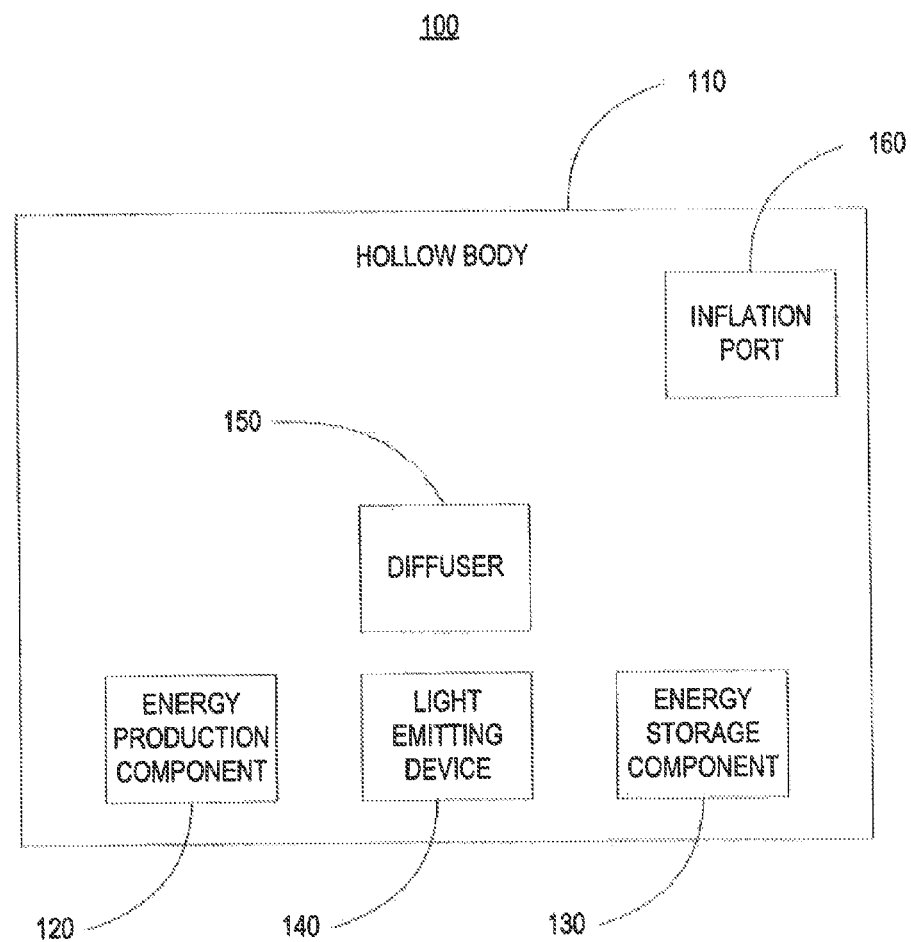
FIG. 1 illustrates a block diagram of a solar-powered light source according to various embodiments of the disclosure.

Referring to FIG. 1, a block diagram of a solar-powered light source is illustrated according to various embodiments of the disclosure. Solar-powered light source ("SPLS") 100 may comprise a hollow body 110, energy production component 120, energy storage component 130, light emission device 140, diffuser 150, and inflation port 160.

Hollow body 110 may be any three-dimensional shape. For example, in various embodiments hollow body 110 may be spherical, cylindrical, toroid, cubical, or shaped like an animal or any other object. In various embodiments, hollow body 110 may be inflatable. Hollow body 110 may be flexible, such that hollow body 110 may be collapsible when not inflated in order to take up less space. In various embodiments, hollow body 110 may be partially inflatable and partially not inflatable. For example, hollow body 110 may comprise a solid lower portion with an inflatable upper portion, such that when deflated the hollow body 110 may collapse to substantially the same size as the lower portion. Hollow body 110 may be any material which allows transmission of solar energy and is capable of holding a gas, such as air. In various embodiments hollow body 110 may comprise plastic or rubber.

Energy production component 120 may be any device capable of generating electrical energy. In various embodiments energy production component 120 may absorb solar energy in order to create energy. For example, energy production component 120 may comprise photovoltaic cells. Energy production component may comprise a rechargeable or non-rechargeable battery which may be replaced. Energy production component 120 may be coupled to an interior surface of hollow body 110. In various embodiments, SPLS 100 may comprise a plurality of energy production components 120. Energy production components 120 may be evenly spaced inside hollow body 110 in order to provide a balanced weight distribution. However, depending on the shape of hollow body 110, energy production components 120 may be distributed unevenly in order to better distribute light or weight in a preferred manner. For example, in various embodiments one or more energy components 120 may be located at a lower portion of hollow body 110 and one or more energy components 120 may be located at an upper portion of hollow body 110.

In various embodiments, energy production components 120 may be positioned at an angle complementary to the latitude where SPLS 100 may be sold in order to maximize solar energy production. For example, for an SPLS sold at latitudes near the equator (0 degrees latitude), energy production components may be perpendicular (90 degrees) to a vertical axis of SPLS 100. For an SPLS sold in New York City (40 degrees latitude), energy production components may be positioned at a 50 degree angle relative to a vertical access of SPLS 100. In various embodiments, energy production component 120 may be wind powered. Energy production component may comprise a windmill or turbine which spins in response to a fluid moving past the blades. The rotation may be transferred into electrical, mechanical, or chemically stored energy.

In various embodiments, SPLS may comprise a fan. The fan may run off of electricity generated by energy production component 120. The fan may cause the hollow body to move or rotate in a visual display.

Energy storage component 130 may be any device capable of storing energy. For example, energy storage component 130 may comprise a battery or a capacitor. In various embodiments energy storage component 130 may comprise a rechargeable battery. The rechargeable battery may be removable from SPLS in order to replace the rechargeable battery. In various embodiments energy storage component 130 may comprise a non-rechargeable battery. Energy storage component 130 may be electrically coupled to energy production component 120. The electrical energy created by energy production component 120 may be stored in energy storage component 130.

Light emission device 140 may be any device capable of emitting light. For example, light emission device 140 may comprise at least one of a light emitting diode ("LED"), a compact fluorescent light, or an incandescent light bulb. In various embodiments, light emission device 140 may comprise a plurality of LEDs. The plurality of LEDs may be a plurality of colors. In various embodiments, a photoelectric sensor may control the light emission device 140 such that the light emission device turns on when ambient light is below a predetermined threshold. In various embodiments, the light emission device 140 may be controlled by a manual switch, automatic sensing of light, voltage sensor, integrated timers, or by any other control.

Diffuser 150 may be any device capable of reflecting or refracting light. Diffuser 150 may transform a point light source to an area light source, thus illuminating SPLS more evenly when viewed from the outside. In various embodiments diffuser 150 may comprise hard or soft plastic, including injection mold, PVC, or part of hollow body 110. Diffuser 150 may comprise a lens or reflective material. In various embodiments diffuser 150 may be coupled to light emission device 140. Diffuser may comprise a reflective material coupled to the interior surface of hollow body 110. In various embodiments, hollow body 110 may be the diffuser 150. For example, hollow body 110 may comprise a frosted plastic which distributes the light from light emission device 140. Hollow body 110 may exhibit reflective properties on the interior surface such that the light is reflected in multiple angles prior to exiting SPLS 100.

In various embodiments, at least one of energy production component 120, energy storage component 130, light emission device 140, and diffuser 150 may be located in an interior portion of hollow body 110.

Inflation port 160 may comprise any device which allows a gas, such as helium, hydrogen, nitrous oxide, nitrogen, oxygen, air, or any other gas, to flow through an aperture into hollow body 110 or a portion thereof, for example a channel as discussed infra. For example, inflation port 160 may comprise a hole with a plug. The plug may be removable, such that a user may insert gas into hollow body 110 using their mouth, a pump, or any other method.

In various embodiments, energy production component 120, energy storage component 130, and light emission device 140 may be coupled together in a light emission system. The light emission system may further comprise a printed circuit board assembly ("PCBA"). PCBA may electrically couple the various components of light emission system. The PCBA may contain programmable electronic components, such as integrated circuits or semiconductor packages. The PCBA may be programmed to control the light emission system such that the light emission devices are illuminated in a pre-defined pattern. In various embodiments, the light emission system may have various modes which a user may select. In various embodiments, a user may select between a standard mode, a motion activated mode, a random mode, or a sound activated mode.

In various embodiments, SPLS 100 may comprise a speaker. The speaker may be electrically coupled to the PCBA. The PCBA may be programmed to emit songs, tunes, or other sound effects from the speaker. The sounds emitted from the speaker may be coordinated with the light emission system. Additionally, the speaker may emit sounds during daylight hours when the light emission system is dormant. In various embodiments, SPLS 100 may comprise a motion sensor, such that SPLS 100 emits sound via the speaker when motion is detected. For example, the motion sensor may comprise an accelerometer to detect motion of SPLS 100, and/or the motion sensor may detect motion of an external object. In various embodiments, SPLS 100 may emit sound in response to impact from an external object. In various embodiments, SPLS 100 may only emit sound when energy storage component 130 is charged beyond a predetermined level, such as 50% or 100%. As such, SPLS 100 may ensure that ample energy is stored to generate light, while using excess energy to produce sound.

In various embodiments, SPLS 100 may connect to a network. SPLS 100 may communicate information received from the network via the speaker. For example, SPLS 100 may obtain a weather report from the network and announce the information over the speaker.

Figure 2A:
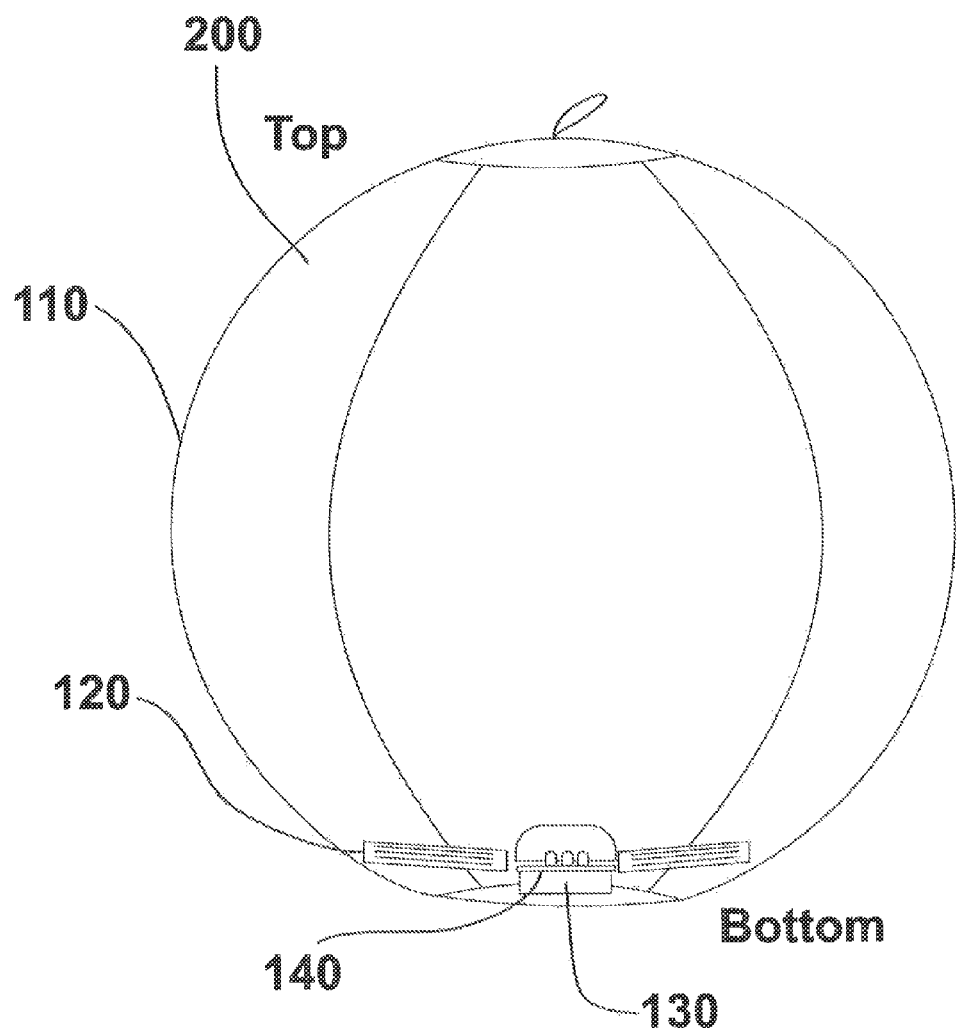
FIG. 2A illustrates a spherical solar-powered light source according to various embodiments.

Referring to FIG. 2A, a spherical SPLS 200 is illustrated according to various embodiments. In various embodiments, SPLS 200 may be self-righting. SPLS 200 may comprise a weighted base, allowing SPLS 200 to remain upright and in place. At least one of the energy production component 120, the energy storage component 130, the light emission device 140, the diffuser 150, or any other object may provide the weight for the weighted base. In response to a perturbation from the upright position, such as physical contact from an external object or a gust of wind, the weighted base may be radially displaced from the center of gravity of the SPLS, such that the weight of the weighted base causes SPLS 200 to return to the upright position. In various embodiments, hollow body 110 may have a rounded or spherical lower portion in order to facilitate the return to the upright position. In various embodiments, energy production component 120 may face along a vertical axis of SPLS 200, such that by returning to the upright position, SPLS 200 causes energy production component 120 to be in a position capable of collecting solar energy. SPLS 200 may be self-righting when floating in water or when placed on a hard flat surface, and thus may improve the amount of energy collected by energy production component 120.

In various embodiments, hollow body 110 may comprise printed graphics which display a message, or may be clear or opaque, or any combination thereof. In various embodiments hollow body 110 may be in the shape of any inflatable geometric or character shape which can stand, hang, or float indoors or outdoors. In various embodiments, SPLS 200 may comprise a loop to hang SPLS 200.

In various embodiments, SPLS 200 may comprise a lower attachment that can be used to anchor SPLS 200 against movement by wind or other forces. For example, lower attachment may comprise a hook or loop that allows SPLS 200 to be staked or tied to the ground. SPLS 200 may comprise an anchor coupled to the lower attachment. In various embodiments, the anchor may suspend from the lower attachment, such that when SPLS 200 is floating in water, the weight of the anchor may provide a self-righting effect. The lower attachment may be located substantially at the bottom of SPLS 200. In various embodiments, SPLS 200 may comprise a plurality of lower attachments. The anchor may be coupled to the plurality of lower attachments. A separate anchor may be coupled to each of the plurality of lower attachments.

Figure 2B:
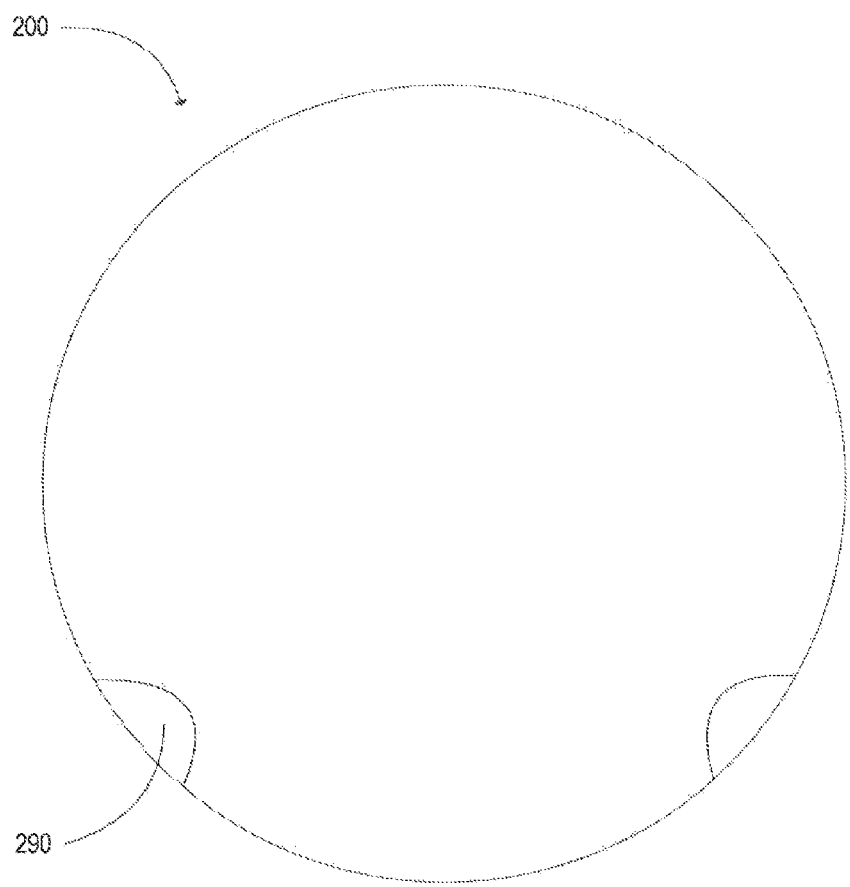
FIG. 2B illustrates a cross-section of a solar-powered light source according to various embodiments.

Referring to FIG. 2B, a cross-section of SPLS 200 is illustrated according to various embodiments, in various embodiments, SPLS 200 may comprise one or more ballasting channels 290. Ballasting channels may be filled with water, sand, or any medium to provide an additional self-righting effect. Ballasting channels 290 may extend the entire circumference of SPLS 200. Alternatively, ballasting channels 290 may extend in various sections in SPLS 200. Ballasting channels may automatically fill with water in response to SPLS 200 being placed in water.

In various embodiments, SPLS 200 may comprise a motor. The motor may be powered by energy production component 120 and/or energy storage component 130. The motor may be powered by a power source separate from energy production component 120 and energy storage component 130. The motor may be wind-powered. In various embodiments the motor may inflate SPLS 200. For example, in response to the sun providing energy to energy production component 120, the motor may actuate a fan which inflates SPLS 200. The motor may drive movable components of SPLS 200. For example, the motor may cause a decorative piece to rotate. The motor may drive paddles or wheels which cause SPLS to move.

Figure 3A:
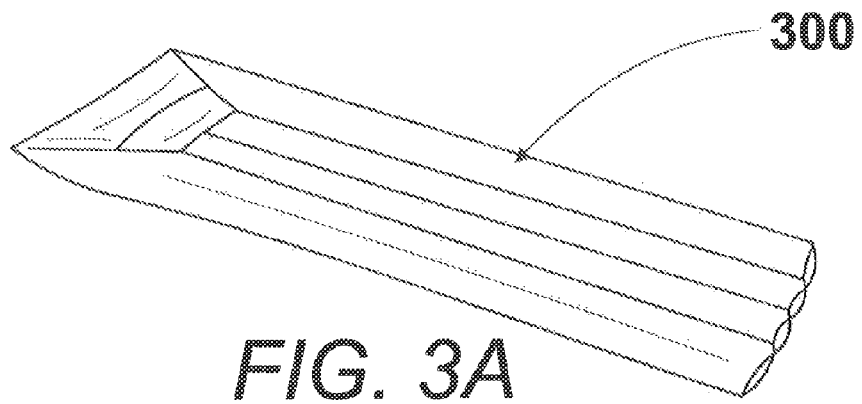
FIGS. 3A-3B illustrate an inflatable lounge according to various embodiments.
Figure 3B:
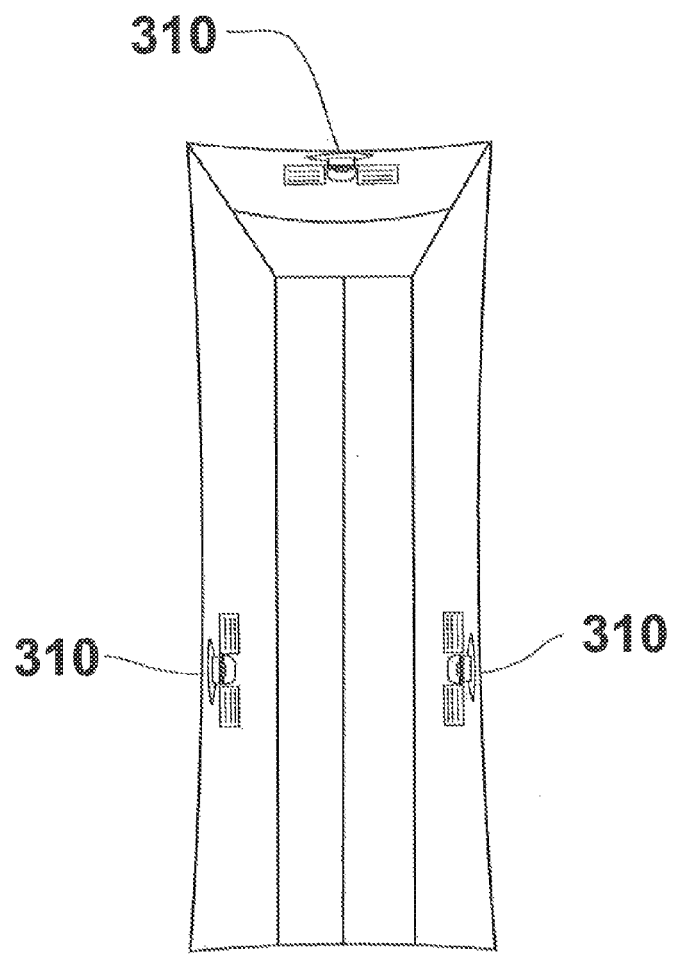

Referring to FIGS. 3A and 3B, an SPLS 300 is illustrated according to various embodiments. SPLS 300 may comprise a lounge style pool float. SPLS 300 may comprise a plurality of light emission systems 310. In various embodiments, the light emission systems 310 may all face the same direction, such that when SPLS 300 is upright, all light emission systems 310 may collect solar energy. However, in various embodiments, some light emission systems 310 may face in opposite directions, such that certain light emission systems 310 may collect solar energy regardless of which side SPLS 300 is floating on. In various embodiments, light emission systems 310 may be upward facing when SPLS 300 is inflated. The plurality of light emission systems 310 may be electrically coupled, such that a first light emission system 310 may be able to transfer excess energy to a second light emission system 310.

Figure 4A:
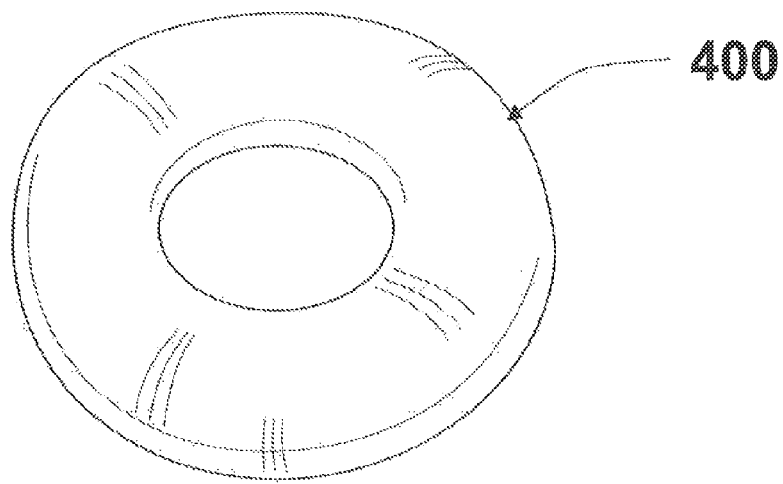
FIGS. 4A-4B illustrate an inflatable torpid according to various embodiments.
Figure 4B:
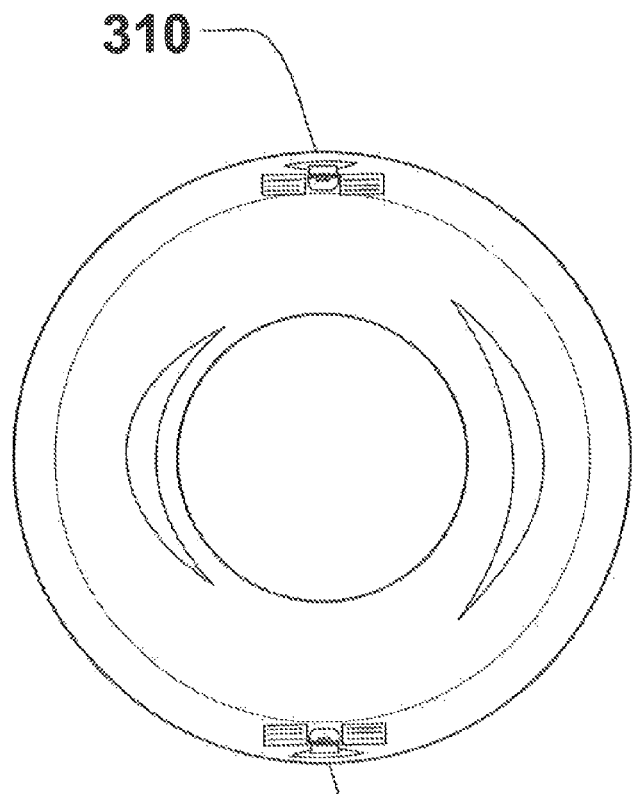

Referring to FIGS. 4A and 4B, an SPLS 400 is illustrated according to various embodiments. SPLS 400 may comprise a toroid shape. SPLS 400 may comprise a plurality of light emission systems 310. The plurality of light emission systems 310 may be positioned at opposite sides of SPLS 400. The positioning of the light emission systems 310 may keep SPLS symmetrically balanced and aid in self-ballasting.

Figure 5A:
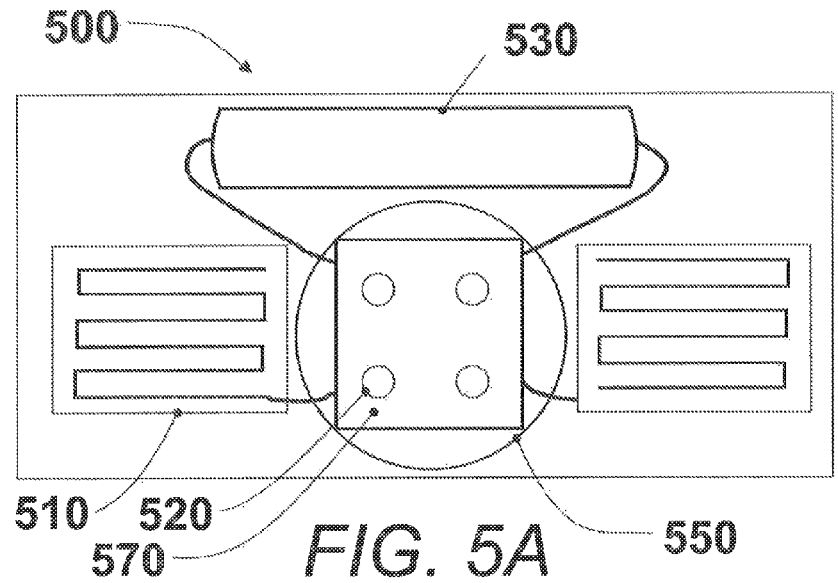
FIGS. 5A-5B illustrate a light emission system according to various embodiments.
Figure 5B:
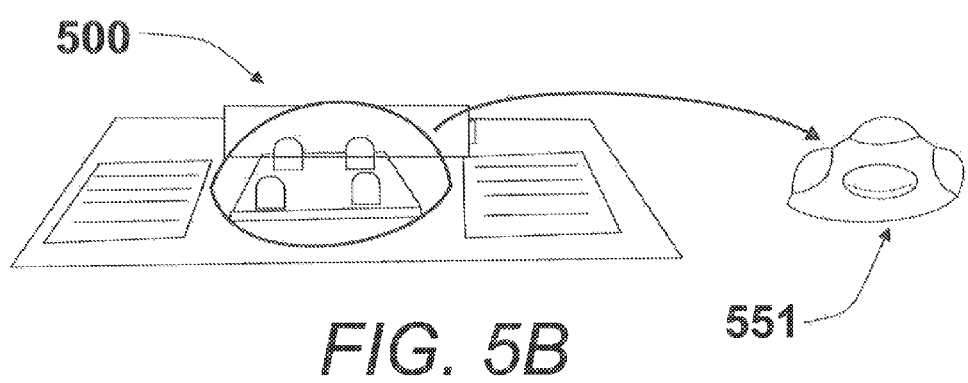

Referring to FIGS. 5A and 5B, a light emission system is illustrated according to various embodiments. Light emission system 500 may comprise a solar cell 510, a light source 520, a battery or rechargeable cell 530, a diffuser 550, and a PCBA 570. In various embodiments, the diffuser 550 may be positioned over PCBA 570. The diffuser 550 may comprise any type of structure or method which creates a more even light area within an SPLS. As shown on diffuser 551, the diffuser 551 may comprise a plurality of lenses in a lens array. In various embodiments, diffusers may be dome shaped or cone shaped. In various embodiments, a diffuser may be constructed of substantially similar material as the hollow body 110 and may be part of the structure of the hollow body 110 itself. The diffuser may be translucent, textured, semi-opaque, injection molded, extruded, or any other process material, with or without lenses incorporated into the design.

In various embodiments, the light emission system may further comprise a light programming mechanism or other control system. A light programming mechanism is any device capable of being programmed to produce one or more flashing or continuous light patterns by controlling and/or varying the output characteristics of the light emission device 140, such as, flash rate, frequency, period, and/or intensity.

In various embodiments, the light programming mechanism may comprise programmable circuitry or other like control system components. For example, the light programming mechanism may comprise an electrical circuit having various electronic components such as integrated circuits, processors and the like. Thus, the light programming mechanism may comprise any device capable of providing one or more light patterns.

The light assembly may further comprise an activation device. An activation device is any device capable of activating and/or deactivating the light emission system. In various embodiments, activation device is a button that is located on the exterior surface of a top portion of SPLS 100 to facilitate user access. However, activation button may also be located anywhere on SPLS 100.

In various embodiments, the light programming mechanism comprises a timer switch that can be selected by the individual, e.g., to operate for one hour, three hours, six hours or any other desired amount of time. Such a timer switch can be activated manually, e.g., by turning a dial or other switch device, or through programming of light programming control system. In addition to timing of operation, different light flashing programs can also be selected, either manually or through programming. In various embodiments, the light programming control system can also be configured with a remote control or other like device, e.g., an infrared control unit mounted within SPLS and configured to control light emission system, to allow individuals to remotely program or otherwise remotely operate SPLS 100. As such, a light programming mechanism can create many different light flashing programs, which can generate a decorative light show on the surface of hollow body 110.

In various embodiments, SPLS may be controlled by any type of radio-controlled device such as RF, IR, WiFi, etc. This allows a user to control an SPLS via any remote control device, including an application on a portable phone or computer. Thus, a user may control the light display, including synchronizing the display with music. In various embodiments, multiple SPLSs may be synchronized to exhibit the same display, or different displays that complement each other. In various embodiments, SPLSs may automatically synchronize, such that when a new SPLS is added to an area with an existing SPLS the new SPLS may detect the existing SPLS and its corresponding display pattern, or vice versa, and the new SPLS may exhibit the same display as the existing SPLS. Alternatively, the new SPLS may automatically exhibit a complementary display to the existing SPLS.

In various embodiments, SPLS may be sound-activated. For example, sounds of different pitch, volume, or tone may cause SPLS to light up in different manners. SPLS may additional be voice activated, such that SPLS may detect certain words and may respond to verbal commands. Using voice activation, the speaker, and by connecting to the network, SPLS may be capable of receiving and communicating a variety of information.

In various embodiments, an SPLS may comprise hermetically sealed pockets within hollow body 110. The hermetically sealed pockets may contain at least one of the energy production component 120, energy storage component 130, light emission device 140, and diffuser 150. The hermetically sealed pockets may be located between an inner layer of hollow body 110 and an outer layer. The hermetically sealed pockets may be evenly spaced about a lower portion of the hollow body 110 in order to provide an even weight distribution and assist in self-righting.

In various embodiments, the light emission system may be self-righting within SPLS 100. For example, light emission system may be spherical. Light emission system may be asymmetrically weighted such that gravity causes light emission system to position itself with energy production component 120 pointed opposite the direction of a gravitational force. As such, energy production component 120 may collect solar energy regardless of the position of SPLS 100.

In various embodiments, SPLS 100 may comprise a magnetic alignment device. Magnetic alignment device may comprise any material capable of interacting with a magnetic field. For example, magnetic alignment device may comprise alnico or ferrite. Magnetic alignment device may comprise an electromagnet, such as a copper wire in a coil. The electromagnet may exhibit magnetic properties when electricity is applied to the wire. The power for the electricity may be supplied by energy production component 120. Magnetic alignment device may be aligned such that the earth's magnetic field produces a force on magnetic alignment device which causes SPLS 100 to rotate when floating in water or hanging from a string. SPLS 100 may rotate such that the energy production component 120 is optimally positioned to absorb solar rays. For example, in the Northern hemisphere, magnetic alignment device may cause SPLS 100 to rotate such that energy production device faces South. In various embodiments, magnetic alignment device may be based on a timer. For example, based on the timer, electricity may be applied to different portions of the magnetic alignment device, or in different polarities. The differing applications of electricity may cause SPLS 100 to rotate such that energy production component 120 faces Southeast before noon, and Southwest after noon. The differing applications of electricity may cause SPLS 100 to progressively rotate clockwise throughout the day, such that energy production component 120 follows the motions of the sun.

Figure 6:
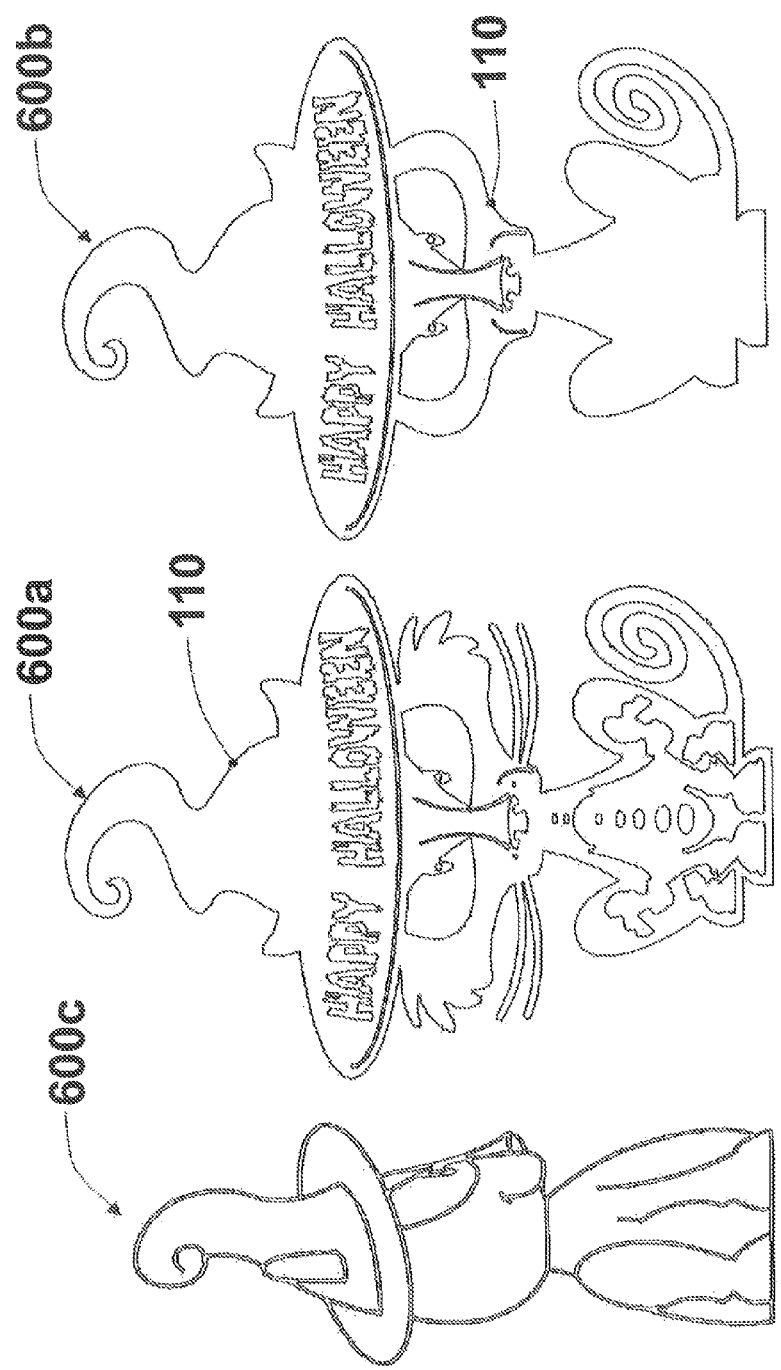
FIG. 6 illustrates a solar-powered light source with a printed design according to various embodiments.

Referring to FIG. 6, an SPLS 600 is illustrated according to various embodiments. Hollow body 110 may comprise a printed design on at least one of an interior surface or an exterior surface. For example, a first design may be printed on the exterior surface, such that the first design is visible from the exterior, and a second design may be printed on the interior surface, such that when light emission device 140 is emitting light, the second design may be visible through the exterior surface of SPLS 600a. The first design may prevent the transmission of light through the exterior surface when light emission device 140 is not emitting light of SPLS 600b. SPLS 600c represents a side view of SPLS 600. The designs may be any type of design including pictures, words, symbols, characters, shapes, colors, or any other indicia. For example, an image of a black cat may be printed on the exterior surface, and an image of a skeleton may be printed on the interior surface. When light emission device 140 is not emitting light, only the image of the black cat may be visible from the exterior. However, when light emission device 140 is emitting light, the image of the black cat may be back-lit, and the image of the skeleton may be visible from the exterior. Additionally, designs may be printed in various colors, such that different designs may be visible from the exterior in response to different colors being emitted by light emission device 140. In various embodiments, when light emission device 140 emits red light, only blue designs on an SPLS may be visible from the exterior, and when light emission device 140 emits blue light, only red designs on an SPLS may be visible from the exterior. One skilled in the art will appreciate that any combination of colors of lights and designs is within the scope of this disclosure.

Referring to FIGS. 7A and 7B, an SPLS 700 is illustrated according to various embodiments. SPLS 700 may comprise a chlorinator basket 710. Chlorinator basket 710 may comprise any shape capable of holding a chlorinator tab. For example, in various embodiments chlorinator basket 710 may be cylindrical. In various embodiments chlorinator basket 710 may comprise an opening 720 at a first end 730. Opening 720 may allow a chlorinator tab to be inserted into chlorinator basket 710. In various embodiments, chlorinator basket 710 may allow water to pass through chlorinator basket 710. For example, chlorinator basket 710 may be porous, or comprise holes or slots that allow the transmission of water. As such, a chlorinator tab within chlorinator basket 710 may be in contact with water when SPLS 700 is placed in a body of water, such as a pool, and the chlorinator tab may provide a cleaning effect to the water.

In various embodiments, chlorinator basket 710 may comprise a dry storage compartment. The dry storage compartment may be capable of keeping one or more chlorinator tabs from contacting the water. As such, while one chlorinator tab is in contact with the water, others may be kept in dry storage for future use. The dry storage compartment may be accessed by removing a cap from the first end 730 or the second end 740, or by any other method.

In various embodiments, chlorinator basket 710 may be capable of coupling to a hollow body 750. The coupling may be achieved by any manner known in the art. Chlorinator basket 710 may comprise threads 735 at the first end 730 such that chlorinator basket 710 may couple to hollow body 750 by twisting either chlorinator basket 710 or hollow body 750.

The weight of chlorinator basket 710 may cause SPLS 700 to be self-righting when floating in water, such that at least a portion of chlorinator basket 710 is located under water, and at least a portion of hollow body 750 is located above water. In various embodiments hollow body 750 may comprise ballast such as weights which may include the weight of light emission system 1000 such that hollow body 750 may be self-righting even when not coupled to chlorinator basket 710.

Figures 8A, 8B:
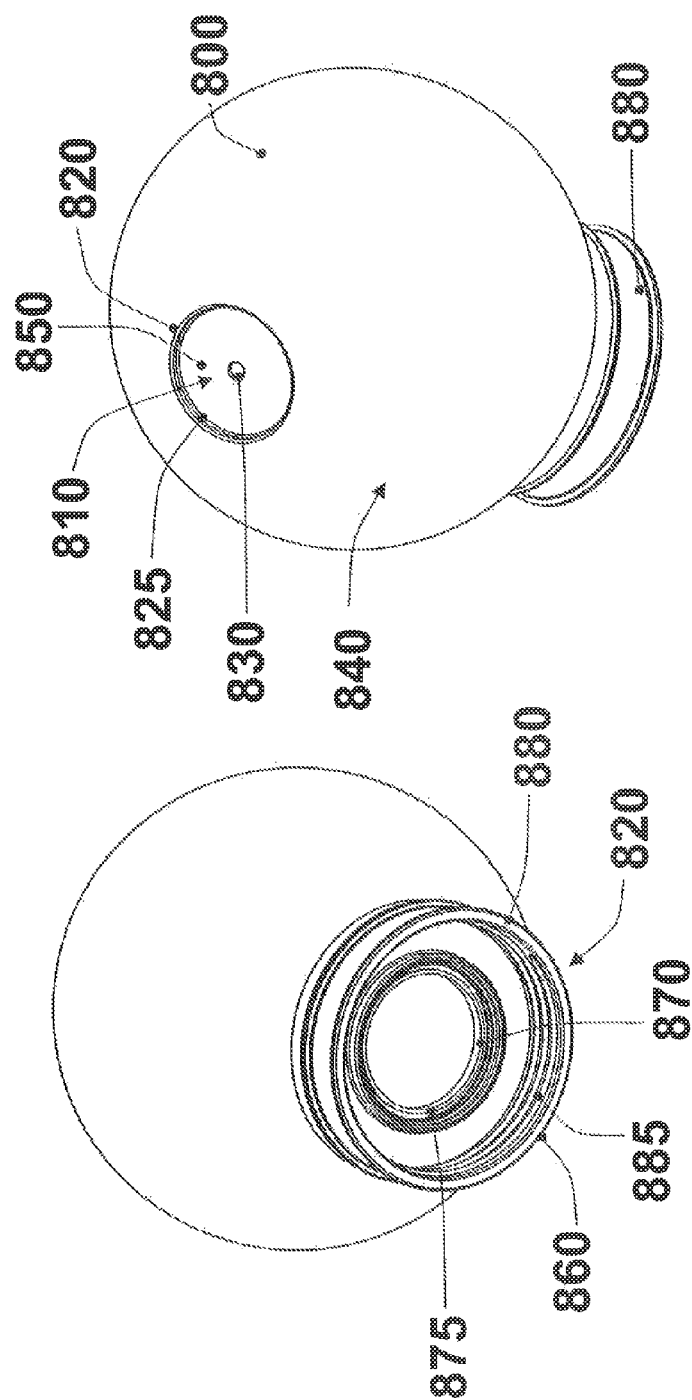
FIGS. 8A-8B illustrate a hollow body according to various embodiments.

Referring to FIGS. 8A and 8B, a hollow body 800 is illustrated according to various embodiments. The hollow body 800 may comprise a variety of shapes. In various embodiments, hollow body 800 may be substantially spherical. In other embodiments hollow body 800 may be any other shape, including shaped like a character, such as a duck. Hollow body 800 may comprise any flexible or rigid material, including plastic, rubber, pvc, fiberglass, or any other material. In various embodiments, hollow body 800 may be inflatable. Hollow body 800 may comprise an interior cavity. Hollow body may be opaque, translucent, or semi-translucent, such that a light in the interior cavity may transmit through hollow body 800 and be visible from the outside.

In various embodiments, hollow body 800 may comprise a first pocket 810 and a second pocket 820. First pocket 810 may comprise a first opening 820 and a second opening 830. First opening 820 may have a diameter that is larger than second opening 830. A depth of first opening 820 may be defined as the distance between an exterior surface 840 of hollow body 800, and a backing 850. The depth of first opening 820 may be less than a thickness of the walls of hollow body 800, such that the walls of hollow body 800 comprise the backing 850. However, in various embodiments first opening 820 extends through the walls of hollow body 800 such that there is no backing 850. First opening 820 may comprise threads 825 that allow an energy production component to be coupled to hollow body 800. Backing 850 may prevent the energy production component from falling into the cavity. Second opening 830 may allow wires coupled to the energy production component to pass through the walls of the hollow body 800 and into the hollow cavity.

In various embodiments, second pocket 820 may comprise a first opening 860 and a second opening 870. First opening 860 may be defined by a neck 880 of hollow body 800. In various embodiments neck 880 may be formed as a continuous member of hollow body 800. However, in various embodiments, neck 880 may be formed separately and coupled to hollow body 800. Neck 880 may comprise threads 885. Threads 885 may allow hollow body 800 to couple to chlorinator basket 710. First opening 860 of second pocket 820 may have a larger diameter than second opening 870. Second opening 870 may pass through the walls of hollow body 800, allowing a light emission device to be placed in the hollow cavity. Second opening 870 may comprise threads 875, which allow a light emission device to be coupled to hollow body 800.

Referring to FIGS. 9A-9C, various views of hollow body 800 are illustrated according to various embodiments. An energy production component 910 may be coupled to the hollow body 800 at first pocket 810. Energy production component 910 may be coupled to the hollow body 800 via threads 825. However, in various embodiments, energy production component 910 may be coupled to hollow body 800 with an adhesive or sealant, or any other method known in the art.

A light emission device 920 may be coupled to hollow body 800 at second opening 870 of second pocket 820. Light emission device 920 may comprise threads such that light emission device 920 may be coupled to hollow body 800 via threads 875. Energy production component 910 and light emission device 920 may be electrically coupled via wires 930. Wires 930 may be coupled to energy production component 910, enter the hollow cavity of hollow body 800 via second opening 830 of first pocket 810, and be coupled to light emission device 920. As such, energy production component 910 may collect solar energy, convert the solar energy into electrical energy, and transmit the electrical energy to light emission device 920 via wires 930.

Referring to FIGS. 10A and 10B, a light emission system 1000 is illustrated according to various embodiments. Light emission system 1000 may comprise a light emission device 920, an energy storage component 1010, and a diffuser 1020. Light emission device 920, energy storage component 1010, and diffuser 1020 may be similar to those previously described. In the illustrated embodiment, light emission system 1000 does not comprise an energy production component, because light emission system 1000 may be coupled to energy production component 910 as illustrated in FIG. 9. As previously described, light emission system 1000 may be capable of being programmed to display one or more light emission devices in a plurality of colors and/or at preprogrammed or random intervals.

Referring to FIGS. 11A and 11B, an SPLS 1100 is illustrated according to various embodiments. SPLS may comprise chlorinator basket 710, and a hollow body 1110. As illustrated, hollow body 1110 may be any shape, in this case the shape of a duck. SPLS 1100 may comprise energy production component 910 coupled to hollow body 1110 at a first pocket 1120, and a light emission system 1000 coupled to hollow body 1110 at second pocket 1130.

Although described herein with reference to hollow bodies and light emission systems located therein, the present disclosure contemplates any type and/or shape of light source. For example, in various embodiments, the light source may comprise a flexible light mat, which may be located within a hollow body, or disposed on the exterior of a hollow body or a chlorinator basket.

In various embodiments, the light source may be integrated into an existing design. However, in various embodiments, the light source may be added onto an existing product or design by attachment to an existing chemical float of any type using pressure sensitive adhesives, epoxy, sealants, screws, nylon ties, clamps, clips, or any other type of fastening device. In various embodiments, the light source may comprise light emitting diodes, incandescent, electroluminescent or other electrochemical, fluorescent, or any other electrically-powered illumination technology, or any combination of the above. Illumination may be steady, pulsed, or otherwise varied in intensity, and may be of any color or combination of colors.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. Reference to an element in the singular is not intended to mean "one and only one" unless explicitly so stated, but rather "one or more." Moreover, where a phrase similar to 'at least one of A, B, and C' or 'at least one of A, B, or C' is used in the specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

All structural, chemical, and functional equivalents to the elements of the above-described exemplary embodiments that are known to those of ordinary skill in the art are expressly incorporated herein by reference and are intended to be encompassed by the present disclosure. Moreover, it is not necessary for a device or method to address each and every problem sought to be solved by the present disclosure, for it to be encompassed by the present claims. Furthermore, no element, component, or method step in the present disclosure is intended to be dedicated to the public. No element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A solar-powered light source comprising:
a hollow body, wherein the hollow body comprises a first pocket and a second pocket, wherein the first pocket comprises a first opening and a second opening;
an energy production component threaded into the first opening of the first pocket;
a light emission device coupled to a first opening of the second pocket, wherein the energy production component is electrically coupled to the light emission device via a wire extending from the energy production component, through the second opening of the first pocket, through an interior of the hollow body, and coupled to the light emission device, and wherein the light emission device is configured to illuminate the interior of the hollow body; and wherein a diameter of the first opening of the first pocket is greater than a diameter of the second opening of the first pocket; and, wherein a depth of the first opening of the first pocket is less than a thickness of a wall of the hollow body; and
a chlorinator basket coupled to a second opening of the second pocket.

2. The solar-powered light source of claim 1, wherein the hollow body is in the shape of a character.

3. The solar-powered light source of claim 1, wherein the chlorinator basket threadingly engages the second opening of the second pocket of the hollow body.

4. A solar-powered light source comprising:
a self-righting hollow body;
a light emission system located within the hollow body, wherein the light emission system forms a weighted base configured to self-right the hollow body, wherein the light emission system comprises:
a solar cell coupled to an exterior surface of the hollow body and located at least partially within a wall of the hollow body;
a light emission device; and
an energy storage component;
a wire coupled to the solar cell and the energy storage component, wherein the wire extends from the solar cell, through the wall of the hollow body, through an interior of the hollow body, and to the energy storage component; and wherein a diameter of the first opening of the first pocket is greater than a diameter of the second opening of the first pocket; and, wherein a depth of the first opening of the first pocket is less than a thickness of a wall of the hollow body; and
a chlorinator basket coupled to the hollow body.

5. The solar-powered light source of claim 4, wherein the hollow body is in the shape of a character.

6. The solar-powered light source of claim 4, wherein the hollow body conveys a message.

7. The solar-powered light source of claim 4, wherein the solar-powered light source is self-righting in response to being placed in water.

8. The solar-powered light source of claim 4, wherein the light emission system is programmable.

* * * * *

UNITED STATES PATENT AND TRADEMARK OFFICE
CERTIFICATE OF CORRECTION

PATENT NO. : 9,206,952 B2  
APPLICATION NO. : 13/834823  
DATED : December 8, 2015  
INVENTOR(S) : Jason Gold et al.

Page 1 of 1

It is certified that error appears in the above-identified patent and that said Letters Patent is hereby corrected as shown below:

Title Page, Item (72) Inventors, fourth Inventor, ZHAO CHUNHAI country should read -- (CN) --

Signed and Sealed this  
Sixteenth Day of August, 2016

Michelle K. Lee  
*Director of the United States Patent and Trademark Office*